June 4, 1968  E. F. GLASS ET AL  3,386,233
IMPLEMENT FRAME

Filed April 16, 1965  2 Sheets-Sheet 1

INVENTORS
Emmett F. Glass &
BY Horace G. McCarty

Joseph A. Brown
ATTORNEY

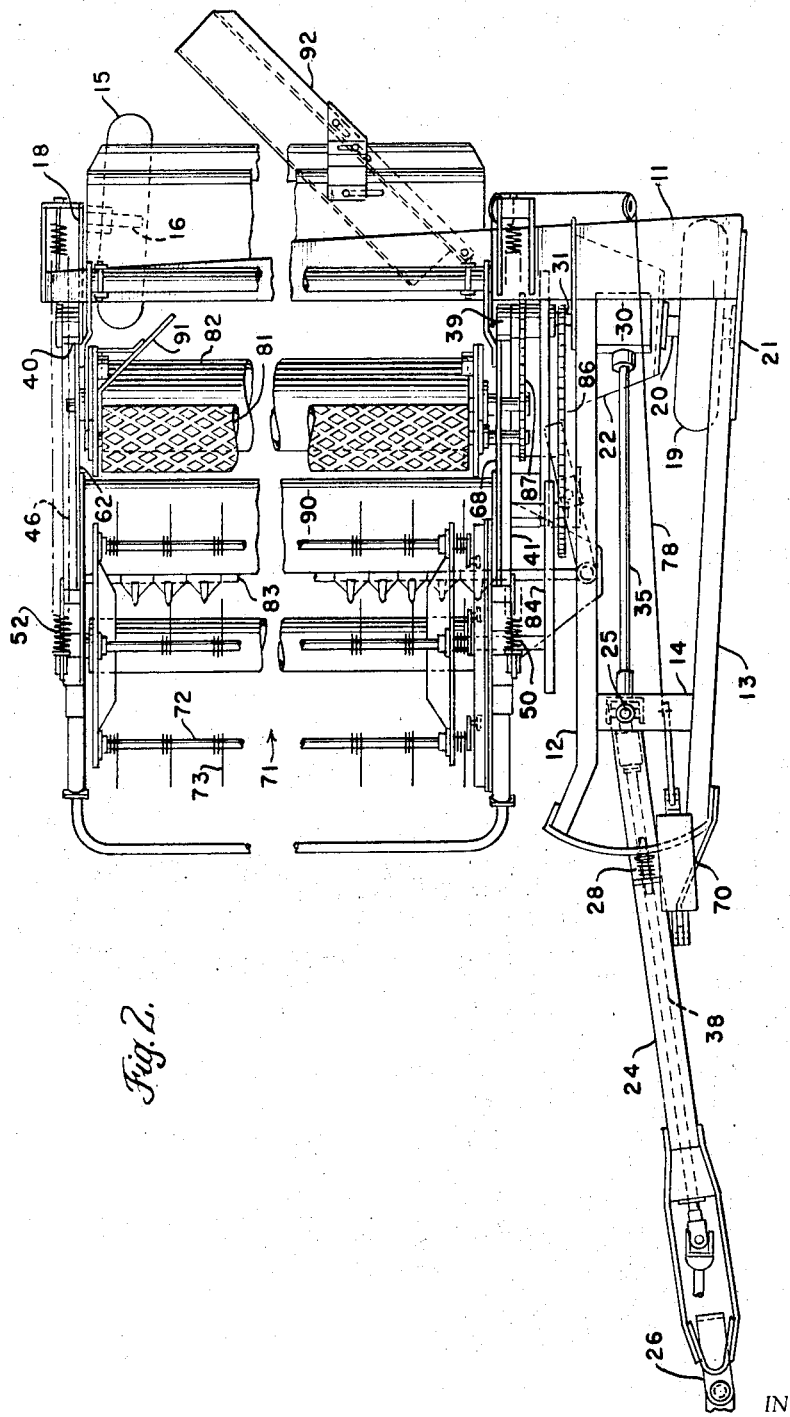

3,386,233
Patented June 4, 1968

1

3,386,233
IMPLEMENT FRAME
Emmett F. Glass, Akron, and Horace G. McCarty, New Holland, Pa., assignors to Sperry Rand Corporation, New Holland, Pa., a corporation of Delaware
Filed Apr. 16, 1965, Ser. No. 448,631
14 Claims. (Cl. 56—23)

ABSTRACT OF THE DISCLOSURE

A harvester in which a header is pivotally mounted to a frame having a transverse section and a fore-and-aft section connected to an inboard end of the transverse section. The transverse section is tapered and is carried by wheels mounted under the section which support the section a sufficient distance above the ground to allow passage of material from the header under the section.

---

This invention relates generally to agricultural equipment and more specifically to a frame construction for a hay making implement.

In the harvesting of hay, it is commonly practiced to condition the crop material to facilitate drying. This is done by passing the hay between crushing or crimping rolls to open the fibers of the plants and thereby facilitate drying. It is well known, that the conditioning of the crop should take place as close as possible to the time when the crop is cut. Heretofore, combination mower crushers have been provided where the mower cuts material in one swath while the conditioning implement crushes previously cut crop material in the next adjacent swath. The time lag, therefore, between cutting and conditioning is the time required to make one trip around the field.

In the machine of this invention, the sickle which cuts the crop material and the rolls which condition it operate in the same swath. The implement is towed behind a tractor and extends laterally thereof. The frame structure of the implement carries a forwardly located sickle, a reel above the sickle and a pair of conditioning rolls mounted directly behind the sickle to receive the cut material. The reel rotates to sweep severed crop material directly to the conditioning rolls. Material from the rolls is deposited on the ground in a wide swath or, windrow shields may be provided to engage the material as it is discharged from the rolls to thereby consolidate it.

A machine of the type described presents very substantial side draft problems because the entire operating mechanism of the machine is lateral of the tractor which tows it. A very substantial frame structure must be provided, not only to carry the sickle, conditioning rolls, and reel but the drive structure which operates these elements.

A main object of this invention is to provide a frame structure suitable for a hay making machine of the character described.

Another object of this invention is to provide a hay making machine with a frame structure which allows for the unobstructed flow through the machine of a belt of crop material substantially as wide as the swath cut.

Another object of this invention is to provide an implement, which cuts, conditions and windrows hay, and has a novel offset frame structure and draft means along one side of the frame.

A further object of this invention is to provide an implement frame with a single transverse structural element which serves as a support means for both the wheels and the operating components.

A still further object of this invention is to provide an implement frame which is economical to manufacture and is extremely strong, lightweight, and durable.

2

Other objects of this invention will be apparent hereinafter from the specification and from the recital in the appended claims.

Figure 1:
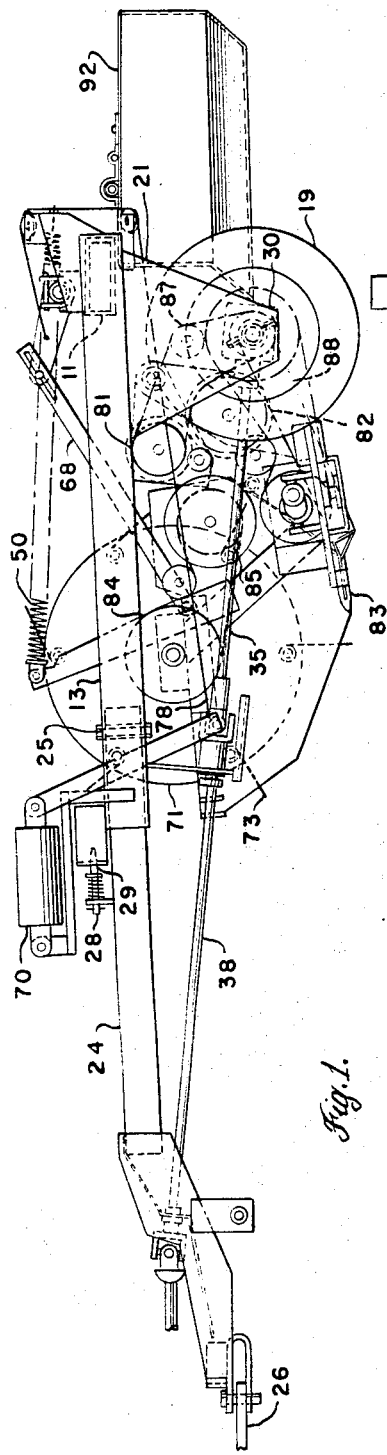

In the drawings:
FIG. 1 is a side elevational view of a hay making machine having frame means constructed according to this invention and showing one of the longitudinal frame elements thereof;
FIG. 2 is a plan view of the machine shown in FIG. 1 with the central portion of the machine broken out to condense the machine width; and
FIG. 3 is a plan view showing the main harvester frame with the longitudinal and transverse frame elements.

Figure 3:
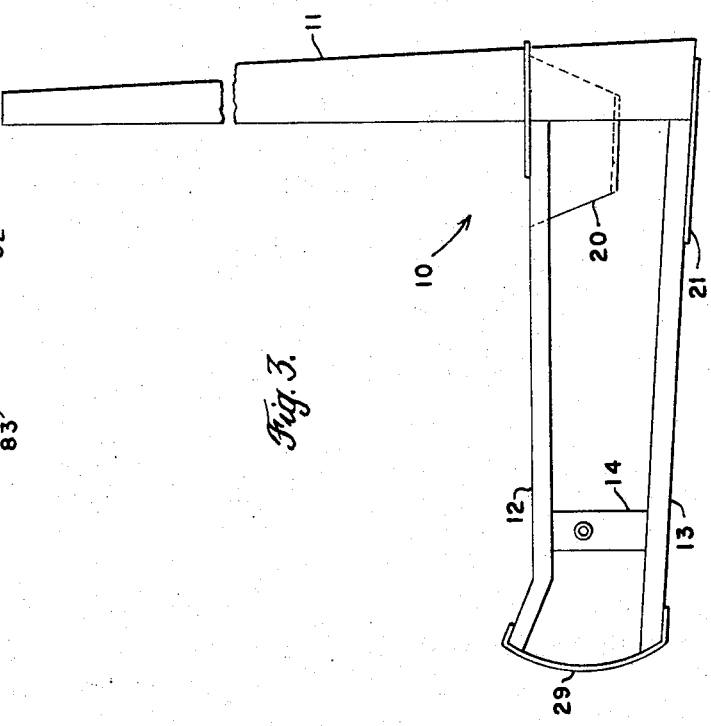

Referring now to the drawings by numerals of reference, and particularly to FIGS. 2 and 3, the hay machine of the present invention has an L-shaped main frame structure generally denoted 10. The machine is adapted to travel from right to left as it is seen in FIGS. 1 and 2. A lateral frame member 11 extends transversely across the width of the machine at the rear thereof, from a left or inboard side along the line of draft to a laterally spaced right or outboard side. At the left side of frame member 11, a pair of longitudinal frame elements 12 and 13 project forwardly and are interconnected near their front ends by a transverse frame member 14. At the right side of frame member 11 a ground wheel 15 is journalled on a spindle 16 which is carried by frame plate 18 depending from frame member 11. At the left side of frame member 11, a ground wheel 19 is journalled on spindle 20 which is carried by and extends between vertical frame plates 21 and 22 which are fixedly attached to, and depend from, frame members 11, 12 and 13. As shown in FIG. 2, the wheel spindles 16 and 20 may be canted relative to the direction of travel of the frame. A drawbar 24 extends forwardly from frame member 12 and 13 and a downwardly extending forward end is connected to tractor drawbar 26 shown fragmentarily. Drawbar 24 is pivotally anchored to main frame member 14 by vertical pivot member 25 for horizontal swinging movement between the operation position, as shown in FIG. 2 and a road transport position, not shown. The drawbar may be latched in either position by spring loaded pin 28 which projects through one of a series of holes, not shown, in latch plate 29 carried by frame members 12 and 13.

A gearbox 30 is disposed adjacent left ground wheel 19. Gearbox 30 has a transversely extending output shaft 31 which constitutes a main drive shaft of the machine. Driving power is supplied to shaft 31 through gear means from a forwardly extending shaft 35. A forward extension 38 of shaft 35 is adapted to be connected to the power-take-off system of the towing vehicle.

Depending from frame member 11 and coaxial with the drive shaft 31 is a transversely disposed journal 39 (see FIG. 2). Coaxial with journal 39, but at the extreme right side of frame member 11, a similar journal 40 is disposed. A sub-frame structure having forwardly extending elements 41 and 46 is pivotally carried by journals 39 and 40. A pair of long fore-and-aft springs 50, 52 are pivotally connected to the forward end of the sub-frame and counter-balance the weight of the sub-frame structure and the elements which are carried thereby. The sub-frame is therefore free to float relative to the ground about mounting journals 39 and 40 in a substantially weightless manner. A means is provided to raise and lower the sub-frame comprising a hydraulic cylinder 70 which is linked to a flexible cable 78 operatively connected to lift links 62, 68 on the sub-frame.

A reel 71 is mounted on a forward portion of the sub-frame. A plurality of bars 72 carrying tines 73 are mounted around the periphery of the reel. The reel is driven from drive means on the output shaft 31. Crop conditioning rolls 81 and 82 are mounted on an intermediate portion of the sub-frame and are also driven from the output shaft 31. A sickle 82 is mounted on a lower forward portion of the sub-frame and extends between sub-frame elements 41 and 46. The drive means connecting the various driven elements with the output shaft is shown in FIGS. 1 and 2 and comprises a reel drive belt 84 connected to intermediate pulley 85, a drive chain 86, a conditioning roll drive chain 87, and a mower drive belt 88. Speed reduction is provided between drive shaft 31 and reel 71, since the rotational speed of the reel 71 must be substantially less than that of the conditioner rolls and the sickle drive mechanism. A rearwardly and upwardly inclined plate 90 is provided rearwardly of the sickle and serves to guide the crop material from the sickle to the conditioner rolls. Vertical guide plate 91 is mounted just rearwardly of the rolls on the right side and serves to guide the conditioned material around wheel 15 and into the discharge control means. Windrow shields are mounted on the main frame member rearwardly of the conditioner rolls to receive the conditioned crop material from the rolls and form it into a windrow as it is discharged on the ground. Left windrow shield 92 is shown in FIGS. 1 and 2; a similar shield, not shown, is mounted on the right side of frame member 11.

In operation, as the machine moves forward, crop material is severed by the sickle 83 located on the forward portion of the sub-frame and the severed material is swept backward by the rotating reel 71 into the conditioner rolls 81, 82. The conditioned crop material is discharged from the conditioner rolls into windrow shields which consolidate it and discharge it into a windrow. The sickle, reel, and conditioner rolls are driven through a series of belts and chains from a central gearbox which derives its power from the tractor power-take-off.

The main frame 10 in the disclosed harvester is located above the conditioning rolls and above the transverse axes of all of the working components. As shown in FIGS. 2 and 3, the generally L-shaped frame 10 has a frame member 11 in the form of a tapered beam with a box-shaped cross section, which is the only transverse frame member. The arrangement of the frame above the working components and the tapered beam structure of the transverse frame member solve the two main support problems encountered in a pull-type harvester of this type: namely, providing enough clearance for the material to pass through the machine unimpeded by the frame structure and providing enough frame strength to contain the tremendous moment which results from towing the machine along one side in dense crop material. It will be noted that the tapered transverse beam provides maximum strength where the bending moment is greatest, i.e. near the left side portion of the harvester frame. The lateral frame member 11 extends horizontally the entire width of the machine which gives greater strength and provides maximum clearance.

An additional feature of this invention is the particular means for connecting the drawbar to the harvester frame. The pivotal connection on cross member 14 is located slightly off center to the right which provides a turning moment tending to counteract the moment produced by the crop material entering the harvester. When it is desired to tow the harvester on the road, the drawbar 24 is pivoted to the right so that the harvester will be drawn directly behind the tractor to provide for maximum clearance. The forward end of the drawbar terminates in a downwardly extending hitch portion which is adapted to connect to the tractor. By this arrangement, the frame is maintained above the conditioner rolls, while the line of draft through the hitch portion will be substantially lower and generally in line with the lowest extension of the lower conditioner roll.

While this invention has been described in connection with a particular embodiment thereof, it will be understood that it is capable of modification, and this application is intended to cover any variations, uses, or adaptations following, in general, the principles of the invention and including such departures from the present disclosure as come within known or customary practice in the art to which the invention pertains, and as fall within the scope of the invention or the limits of the appended claims.

Having thus described our invention, what we claim is:

1. An agricultural implement adapted to be towed behind a vehicle in a forward direction and having an inboard side and an outboard side comprising in combination a mobile main frame, laterally spaced wheels supported on stub shafts, said shafts extending laterally from vertical brackets attached to said main frame, a sub-frame carried by said main frame and pivotally connected thereto, a sickle on a forward portion of said sub-frame, a reel mounted above said sickle for rotatable movement about a transverse axis on said sub-frame, a pair of crop conditioning rolls on said sub-frame rearwardly of said reel for receiving cut material from said sickle and discharging said material rearwardly, discharge control means on said main frame for receiving material from said conditioning rolls and depositing it on the ground in the desired form, a drive assembly mounted on said main frame extending in a fore-and-aft direction, means connecting said sickle, said reel, and said rolls to said drive assembly, said main frame being generally L-shaped and comprising a horizontal lateral frame element extending from said inboard to said outboard side and transverse to the direction of travel and a pair of longitudinal frame elements extending in the direction of travel, said lateral frame element being tapered in form and having a wide cross section on said inboard end and a relatively narrow cross section on said outboard end, means connecting said longitudinal frame elements at their forward ends, a drawbar connected to said connecting means for towing the implement, said main frame elements being spaced above said conditioner rolls to provide a clear area for the discharge of material from said rolls, and hitch means on the forward end of said drawbar extending forwardly and downwardly from said drawbar whereby the line of draft of said implement is substantially below the main frame elements and generally in line with the lowest extension of said conditioning rolls.

2. An agricultural implement, as recited in claim 1, wherein said lateral frame element is formed from a tapered box section beam, the maximum bending forces on said lateral frame element being resisted by the wide cross sectional portion of said lateral frame element.

3. An agricultural implement, as recited in claim 1, wherein said connecting means is a cross member substantially parallel to said lateral frame element, one of said longitudinal frame elements is spaced outwardly toward said outboard end, said drawbar is pivotally connected to said cross member at a point closer to said one longitudinal frame element than to the other, and said drawbar is pivotal from a first position along said inboard side when said implement is being operated in the field to a second position toward said outboard side when it is desired to tow said implement on the road.

4. An implement, as recited in claim 1, wherein lifting means is provided to raise and lower said sub-frame, said lifting means comprising a fluid operated piston and cylinder and a cable extending between said sub-frame and said piston.

5. In a harvesting machine, a mobile main frame of substantial width and having an inboard end adjacent severed crop material and an outboard end extending inwardly into the crop material, said main frame being generally L-shaped and comprising a horizontal lateral frame member extending from said inboard to said outboard end, and a longitudinally extending frame portion substantially at right angles to said lateral frame element, and the cross section of said lateral frame element diminishing in width from said inboard end to said outboard end to form a tapered beam.

6. A harvesting machine, as recited in claim 5 wherein said lateral frame element is rectangular in cross section, said longitudinally extending frame portion comprises a pair of laterally spaced longitudinal frame elements, a cross member joins said elements at their forward ends, and a drawbar is pivotally connected to said cross member at a point inboard from the medial portion of said cross member.

7. A harvesting machine, as recited in claim 5, wherein said main frame is supported on a pair of laterally spaced inboard and outboard wheels, a sub-frame is carried by said main frame and pivotally connected thereto, a sickle is supported on a forward portion of said sub-frame, a reel is mounted above said mower for pivotal movement about a transverse axis on said sub-frame, a pair of conditioning rolls are mounted on said sub-frame rearwardly of said reel and mower, said main frame being located above said conditioner rolls and the transverse axis of said reel whereby crop material moving through the harvester will be unimpeded by the main frame structure.

8. A harvesting machine, as recited in claim 7, wherein discharge control means is mounted on said lateral frame element rearwardly of said conditioner rolls and means is provided for raising and lowering said sub-frame.

9. A harvesting machine, as recited in claim 7, wherein said longitudinally extending frame portion comprises inboard and outboard longitudinal frame elements, and said sub-frame is pivotally mounted adjacent said outboard longitudinal frame element.

10. An agricultural implement comprising a frame structure having a horizontal frame member which extends laterally relative to the direction of travel from an inboard to an outboard end and a longitudinal frame section which extends forwardly from the inboard end of said lateral frame member and generally parallel to ground travel, a pair of ground wheels, one wheel being located adjacent the inboard end of the frame member and the other wheel being located adjacent the outboard end of said lateral frame member and said wheels being spaced inwardly of the ends of said frame member, a drawbar on said longitudinal frame section, hitch means on a forward end of said drawbar for connection to a towing vehicle, a sickle, a reel and a pair of conditioning rolls mounted on the frame structure and extending transverse to said direction of travel and all having substantially the same length, said sickle being located forwardly of and below said rolls adjacent the ground for cutting a swath of crop material a width substantially the length of said rolls, said rolls being positioned one above the other adjacent the path of travel of said reel, a stationary guide plate on said frame structure extending upwardly and rearwardly from said sickle to a terminal location adjacent the rolls, said reel having crop engaging tines thereon for raking the crop material over said sickle and then sweeping it upwardly and rearwardly over said guide plate to said rolls, drive means operating said sickle and reel and driving said rolls in opposite directions whereby material will be passed between the rolls and discharged rearwardly therefrom for deposit on the ground, and shaft means extending along said longitudinal frame section for interconnecting said drive means to the power take-off system of the towing vehicle.

11. In a harvesting machine adapted to be towed through a field in a forward direction,
a first generally horizontal frame section, said frame section extending transversely to the direction of travel and having an inboard end along one side of said machine and an outboard end spaced laterally therefrom;
a second frame section having a rear end connected to said first frame section and a forward end spaced from said rear end in the direction of travel, said second frame section extending in a fore-and-aft direction, said second frame section having one side adjacent the inboard end of said first frame section and a second side spaced laterally from said first side and toward the outboard end of said first frame section, cross member means extending between said sides to give rigidity to said second frame section;
drawbar means pivotally connected to said cross member means and extending forwardly of said forward end, said drawbar means being adjustable between transport and operating positions, latch means for fixing said drawbar in an adjusted position;
wheel means supporting said frame sections, said wheel means comprising an inboard wheel support connected adjacent said inboard end of the first frame section, an inboard wheel pivotally mounted on said inboard support, an outboard wheel support extending downwardly from said first frame section adjacent said outboard end, an outboard wheel pivotally mounted to said outboard support plate, said wheels being spaced inwardly of the ends of said first frame section, and said wheels being mounted to extend under said first frame section so that said first frame section is supported a substantial distance from the ground to allow the passage of material thereunder.

12. A harvesting machine, as recited in claim 11, wherein said first frame section is connected directly to said second frame section, and said first and second frame sections lie generally in the same plane.

13. A harvesting machine, as recited in claim 11, wherein said first frame section is tapered and the cross sectional area is greater at said inboard end than said outboard end.

14. A harvesting machine, as recited in claim 11, wherein a header is pivotally mounted to said first frame section, and said header is adapted to discharge crop material in a stream which passes under said first frame section.

References Cited

UNITED STATES PATENTS

| | | | |
|---|---|---|---|
| 2,515,808 | 7/1950 | Stoddard | 56—1 |
| 3,100,373 | 8/1953 | Blanshine | 56—23 X |
| 3,139,717 | 7/1964 | Fischer | 56—23 |
| 3,300,953 | 1/1967 | Glass | 56—23 |

ANTONIO F. GUIDA, *Primary Examiner.*